United States Patent
Wang et al.

(10) Patent No.: US 9,791,872 B2
(45) Date of Patent: Oct. 17, 2017

(54) METHOD AND APPARATUS FOR AN ENERGY SAVING HEATING, VENTILATION, AND AIR CONDITIONING (HVAC) CONTROL SYSTEM

(71) Applicant: Pelco, Inc., Clovis, CA (US)

(72) Inventors: Lei Wang, Clovis, CA (US); Farzin Aghdasi, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 541 days.

(21) Appl. No.: 13/827,717

(22) Filed: Mar. 14, 2013

(65) Prior Publication Data

US 2014/0277757 A1    Sep. 18, 2014

(51) Int. Cl.
    *G06F 19/00*  (2011.01)
    *G05D 23/19*  (2006.01)
    *F24F 11/00*  (2006.01)

(52) U.S. Cl.
    CPC ...... *G05D 23/1927* (2013.01); *F24F 11/0034* (2013.01); *F24F 2011/0061* (2013.01)

(58) Field of Classification Search
    CPC ............. G05D 23/1927; F24F 11/0034; F24F 2011/0061; G06K 9/00778; G06K 9/00201; H04N 7/18
    See application file for complete search history.

(56) References Cited

U.S. PATENT DOCUMENTS

| 5,986,357 | A * | 11/1999 | Myron et al. | 307/116 |
|---|---|---|---|---|
| 6,206,641 | B1 * | 3/2001 | Park et al. | 416/182 |
| 6,916,239 | B2 * | 7/2005 | Siddaramanna et al. | 454/256 |
| 2003/0199244 | A1 | 10/2003 | Siddaramanna et al. | |
| 2003/0209893 | A1 * | 11/2003 | Breed et al. | 280/735 |
| 2005/0001154 | A1 * | 1/2005 | Sumitomo | G06M 1/101 250/221 |
| 2008/0277486 | A1 * | 11/2008 | Seem et al. | 236/49.3 |
| 2009/0005912 | A1 * | 1/2009 | Srivastava et al. | 700/276 |

(Continued)

FOREIGN PATENT DOCUMENTS

| CN | 202216360 U | 5/2012 |
|---|---|---|
| CN | 202303767 U | 7/2012 |

(Continued)

OTHER PUBLICATIONS

Notification of Transmittal of the International Search Report and the Written Opinion for PCT/US2014/024477, "Energy Saving Heating, Ventilation, Air Conditioning Control System," dated Jun. 10, 2014.

(Continued)

*Primary Examiner* — Kidest Bahta
(74) *Attorney, Agent, or Firm* — Hamilton, Brook, Smith & Reynolds, P.C.

(57) ABSTRACT

Embodiments of methods and apparatus disclosed herein may employ depth, visual, or motions sensors to enable three-dimensional people counting and data mining to enable an energy saving heating, ventilation, and air conditioning (HVAC) control system. Head detection methods based on depth information may assist people counting in order to enable an accurate determination of room occupancy. A pattern of activities of room occupancy may be learned to predict the activity level of a building or its rooms, reducing energy usage and thereby providing a cost savings.

28 Claims, 9 Drawing Sheets

(56) References Cited

U.S. PATENT DOCUMENTS

| | | |
|---|---|---|
| 2010/0019051 A1 | 1/2010 | Rosen |
| 2010/0289643 A1 | 11/2010 | Trundle et al. |
| 2010/0299116 A1* | 11/2010 | Tomastik et al. .............. 703/2 |
| 2011/0205366 A1 | 8/2011 | Enohara et al. |
| 2013/0184887 A1* | 7/2013 | Ainsley ............... G05B 15/02 700/291 |
| 2014/0079282 A1* | 3/2014 | Marcheselli ....... G06K 9/00335 382/103 |

FOREIGN PATENT DOCUMENTS

| | | |
|---|---|---|
| CN | 202392916 U | 8/2012 |
| EP | 2 363 657 A2 | 9/2011 |
| WO | WO 2014/150895 | 9/2014 |

OTHER PUBLICATIONS

International Preliminary Report on Patentability for Int'l Application No. PCT/US2014/024477, titled: Energy Saving Heating, Ventilation, Air Conditioning Control System, dated Sep. 15, 2015.

* cited by examiner

| TIMESTAMP ⌐652 | NUMBER OF PEOPLE ⌐654 | LOCATION ⌐656 | ACTIVITY LEVEL OF THE ROOM OCCUPANTS ⌐658 |
|---|---|---|---|
| $TIME_N/DAY_1$ | $NUMBER_1$ | $LOCATION_1$ | $ACTIVITY\ LEVEL_1$ |
| | | | |
| ⋮ | ⋮ | ⋮ | ⋮ |
| $TIME_N/DAY_N$ | $NUMBER_N$ | $LOCATION_N$ | $ACTIVITY\ LEVEL_N$ |

FIG. 6B

METHOD AND APPARATUS FOR AN ENERGY SAVING HEATING, VENTILATION, AND AIR CONDITIONING (HVAC) CONTROL SYSTEM

BACKGROUND OF THE INVENTION

Heating, ventilation, and air conditioning (HVAC) systems provide environmental comfort in an indoor space, such as a room or a building. HVAC systems are typically closed-loop control systems. For example, in a room heated by a hot water radiator, an HVAC system may compare sensed parameters from a room thermostat with radiator settings, such as a valve setting, and may adjust the radiator settings based on the comparison in order to control air temperature in the room.

SUMMARY OF THE INVENTION

Embodiments of the present invention provide a method, apparatus, and corresponding system for controlling environmental comfort. According to one embodiment, a method of controlling environmental comfort of at least one boundary zone may comprise detecting motion of living beings of the at least one boundary zone, the at least one boundary zone having parameters associated therewith available to be used in adjusting an environmental control setting of the at least one boundary zone. The method may further comprise determining a number of living beings present in the at least one boundary zone based on the motion detected and determining at least one environmental control setting to enable control of environmental comfort of the at least one boundary zone based on the number of living beings determined and the parameters associated with the at least one boundary zone.

The parameters associated with the at least one boundary zone include dimensions for the at least one boundary zone, an exhaust fan size for a fan corresponding to the at least one boundary zone, or a combination thereof.

Detecting motion may include monitoring at least one motion or visual sensor mounted within the at least one boundary zone. Detecting motion may further include collecting motion or visual data from the at least one motion or visual sensor to verify and provide error correction for the number of living beings present in the at least one boundary zone determined.

Detecting motion may include monitoring a depth sensor mounted in proximity of an entrance, exit, or pathway of the at least one boundary zone. Detecting motion may further include collecting depth data from the depth sensor monitored to enable statistical modeling used to predict a future number of living beings present in the boundary zone at a given future time.

The depth sensor may include an infrared laser projector coupled to a monochrome complementary metal-oxide-semiconductor (CMOS) sensor configured to capture three-dimensional video data under varying ambient light conditions.

The method may further include receiving depth data from a depth sensor, wherein determining the number of living beings present in the at least one boundary zone includes counting the living beings entering and exiting the at least one boundary zone based on the depth data received. The method may still further include utilizing depth segmentation and head detection methods on the depth data received to enable counting the living beings.

The range for the head size may include a width and radius for the head size in pixels.

The method may further include deriving a range for a head size of a measured living being at a given distance from a depth sensor based on measurements of the measured living being and depth data of the measured living being collected from the depth sensor. The method may include receiving depth data from the depth sensor, wherein determining the number of living beings present in the at least one boundary zone may include counting the living beings entering and exiting the at least one boundary zone by detecting heads of the living beings based on the depth data received and the range for the head size derived.

The at least one boundary zone is at least one of a room, building, or portion of building.

The method may further include controlling heating, ventilation, or air conditioning for the at least one boundary zone based on the at least one environmental control setting determined.

The method may further include learning an activity pattern for occupancy of the at least one boundary zone by associating a timestamp with the number of living beings determined. The method may still further include controlling heating, ventilation, or air conditioning for the at least one boundary zone based on the at least one environmental control setting determined and the activity pattern learned. Controlling heating, ventilation, or air conditioning for the at least one boundary zone may include adjusting the heating, ventilation, or air conditioning levels before or after the at least one boundary zone is occupied based on the activity pattern learned.

It should be understood that embodiments of the present invention can be implemented in the form of a method, apparatus, system, or computer-readable medium with program codes embodied thereon. In general, it should be understood that elements of the method, block, and flow diagrams described herein may be implemented in software, hardware, firmware, as understood by one of ordinary skill in the art. Example embodiments of the present invention may include a non-transitory computer-readable medium containing instructions that may be loaded and executed by a processor, and, when executed, may cause the processor to complete methods described herein. For ease of reading, the term "system" is used in various portions of the description and may represent some or all forms of embodiments and implementations of the present invention, such as systems, methods, apparatuses, devices, computer-readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6B is a block diagram of an embodiment of a table for building occupancy.

DETAILED DESCRIPTION OF THE INVENTION

A description of example embodiments of the invention follows.

As people enter an indoor space, a temperature of the indoor space tends to increase due to heat generated by the people. As people leave the indoor space, the temperature of the indoor space tends to decrease. Embodiments disclosed herein control environmental comfort of at least one boundary zone, such as a room or a building. Embodiments disclosed herein a apply depth sensor to count people accurately using three-dimensional (3D) people counting techniques and control heating, ventilation, and air conditioning (HVAC) based on the 3D people counting and data mining. Data mining may include monitoring motion of the people and determining an activity level based on the motion monitored.

Figure 1:
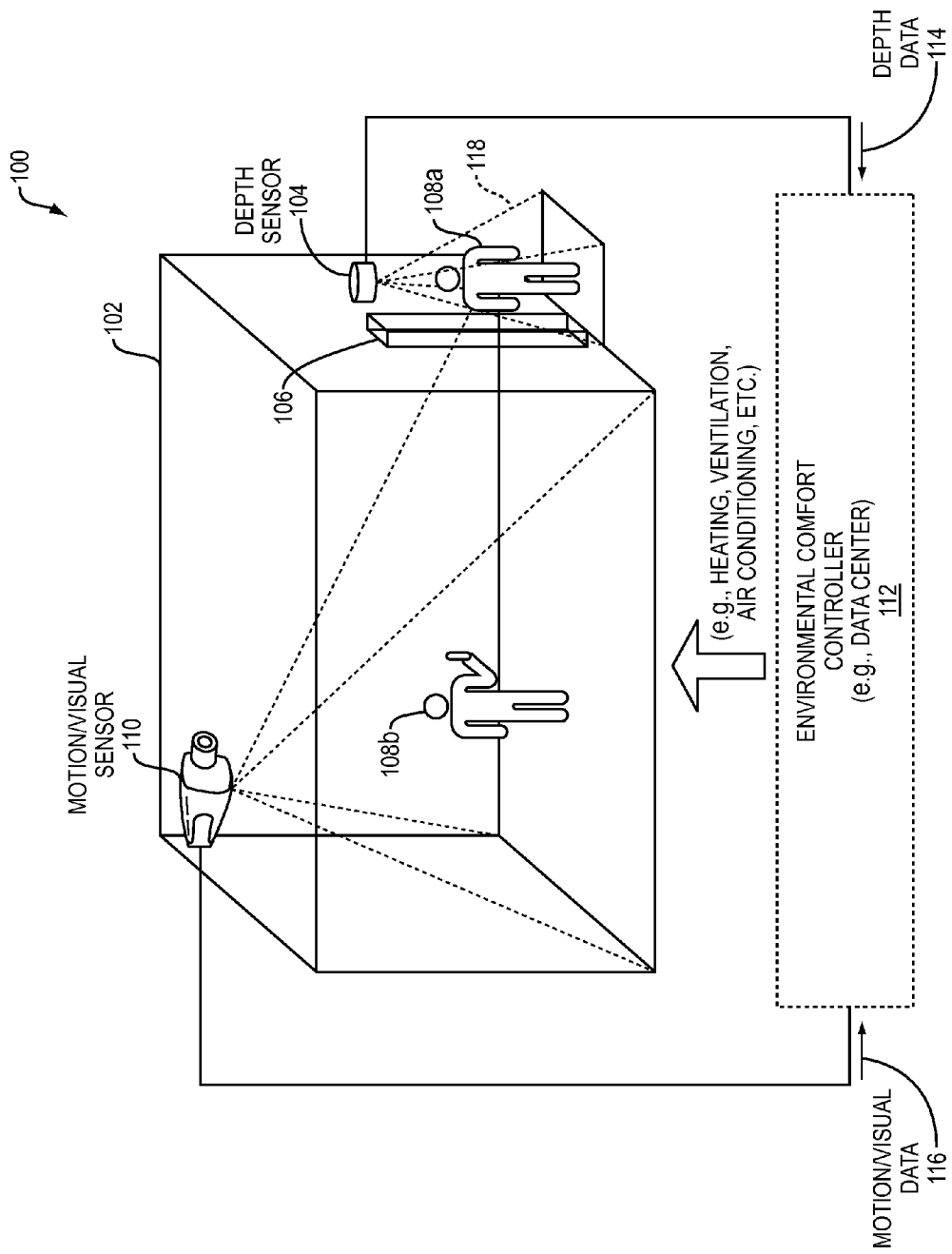
FIG. 1 is a block diagram of an embodiment of a system for controlling environmental comfort of at least one boundary zone.

FIG. 1 is a block diagram of an embodiment of a system 100 for controlling environmental comfort of at least one boundary zone, such as a room 102. The system 100 may include one or more depth sensors 104 that may be mounted above an entrance 106 of the room 102. The depth sensors 104 may be mounted at data collecting points such as doors accessing rooms where entering and exiting of living beings (also referred to herein as people, persons, animals, or any combination thereof) may be monitored. Living beings may be any warm blooded being that generates heat, such as a person or animal.

If there are multiple doors to access a room, a depth sensor 104 may be mounted in proximity to each door. The depth sensor 104 may be mounted in a downward-facing direction. The depth sensor 104 may be configured to monitor and detect motion to enable counting of living beings 108a-108b entering and leaving the room 102 through a detection zone 118. The depth sensor 104 may include an infrared laser projector combined with a monochrome complementary metal oxide semiconductor (CMOS) sensor configured to capture video data in three dimensions (3D) under any ambient light conditions.

The depth sensor 104 may have some fundamental advantages over visible and thermal cameras for detecting motion and enabling counting of objects, such as living beings. For example, the depth sensor 104 may provide depth sensor data 114 (also referred to herein as depth data) that is advantageous over data from a visible camera, such as a video camera, because shadows and reflections are not included in the depth sensor data 114. Shadows and reflections may negatively impact an ability to perform object segmentation, reducing accuracy of counting people based on the data. The depth sensor 104 may also be advantageous over a thermal camera for purposes of counting living beings 108a-108b because temperature change may not provide data relevant to motion detection. The depth sensor 104 may also be advantageous over a traditional passive infra-red (PIR) sensor because the depth sensor 104 may measure the accurate count of objects, such as living beings 108a-108b, instead of simply detecting motion.

An assistant video camera 110 may be mounted in the room 102 and may be used to verify whether or not the room is occupied. Based on the number of people and the size of the room 102, environment comfort, such as heating, air-conditioning, and ventilation, may be controlled by an environmental comfort controller 112 (also referred to herein as a data center). The environmental comfort controller 112 may be implemented in software, hardware, or a combination thereof. The environmental comfort controller 112 may be implemented as a stand-alone controller or as a distributed controller. The environmental comfort controller 112 may be a server coupled to a database (not shown).

Counting of living beings, such as persons, may be based on the depth data 114 from the depth sensor 104. A head detection method, as will be described below in reference to FIG. 4, may be based on the depth data 114 from the depth sensor 104 to count persons. The head detection method may combine effective calibrated head features, fast feature extraction, and efficient classification methods to achieve real-time head detection. The detected heads may be used to assist the head tracking if more than one person is entering the detection zone.

In order to prevent the miscounting, the additional motion/visual sensor may be mounted within the boundary zone for further motion detection, such as the motion/visual sensor 110 shown mounted in the room 102 As more and more data is collected, the counting information may be used as statistical data enabling a derivation pattern of building and room usage over time. According to embodiments disclosed herein, the environmental controller 112 may predict the activity level of a boundary zone, such as building and its rooms, enabling control of HVAC before activities begin and after the activities conclude based on the patterns learned.

For example, in a building such as a business, a room may be used every Monday for status meetings. The meeting may initially begin with a few managers who discuss the meeting's agenda and actions items pending from a previous week's status meeting. After a period of time, such as half an hour, the room may have additional meeting attendees enter the room, tripling the number of occupants. By learning a pattern of activity, the environmental comfort controller 112 may advantageously adjust HVAC settings for the room before, during, and after the Monday morning status meeting, enabling environmental comfort to be provided to the meeting attendees based on the pattern of activity learned.

The environmental comfort controller 112 may be configured to learn a pattern of activities, such as patterns of room occupancy, and may control settings for environmental comfort of the room 102 or other suitable boundary zone based on the pattern of activities learned. Parameter settings for control of heating, air-conditioning or ventilation of the room 102 may be dynamically adjusted prior to the room being occupied based on the number of occupants expected to be present in the room, or other suitable boundary zone, as determined based on the pattern of activities learned. In this way, heat, air-conditioning, and ventilation levels may be reduced or disabled when the room 102 is not in use (e.g., not occupied) and increased to provide air and temperature at a level appropriate for providing comfort as appropriate for the number of people expected to be in the boundary zone, enabling environment comfort to be controlled before people occupy the boundary zone.

According to one embodiment, a pattern of activities may include patterns for room occupancy combined with an activity level of the occupants. For example, occupants in the room 102, such as the living being 108b, may have sedentary motion if the room 102 is being used for a meeting with a purpose of discussion, and the activity level of the occupants learned may be less than if occupants in the room 102, such as the living being 108b, are engaged in aerobic activity. The environmental comfort controller may be configured to control settings for environmental comfort of the room 102 by predicting room occupancy and activity level of the room occupants for various times of a day. The activity level of the room occupants may be learned based on data being collected or gathered by the motion/visual sensor 110. The pattern of activity of room occupancy may be learned based on depth data 114 collected or gathered by the depth sensor 104 that may be combined with the motion/visual data 116 gathered by the motion/visual sensor 110. The environmental controller 112 may combine the motion/visual data 116 and depth data 114 to determine the pattern of activities and dynamically adjust one or more settings for heating, air conditioning, or ventilation in order to provide environmental comfort to occupants in a boundary zone.

Figure 2:
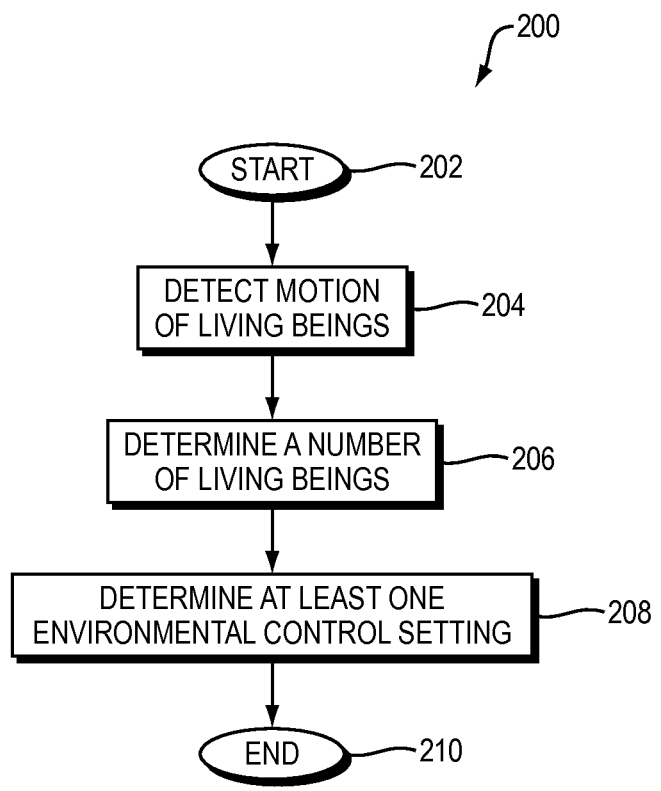
FIG. 2 is an example flow diagram of an embodiment of a method for controlling environmental comfort of at least one boundary zone.

FIG. 2 is an example flow diagram of an embodiment of a method for controlling environmental comfort of at least one boundary zone (200). The method may start (202) and detect motion of living beings of the at least one boundary zone (204). The method may determine a number of living beings present in the at least one boundary zone based on the motion detected (206). The method may determine at least one environmental control setting to enable control of environmental comfort of the at least one boundary zone based on the number of living beings determined and parameters associated with the at least one boundary zone (208), and the method thereafter ends (210) in the example embodiment.

Figure 3:
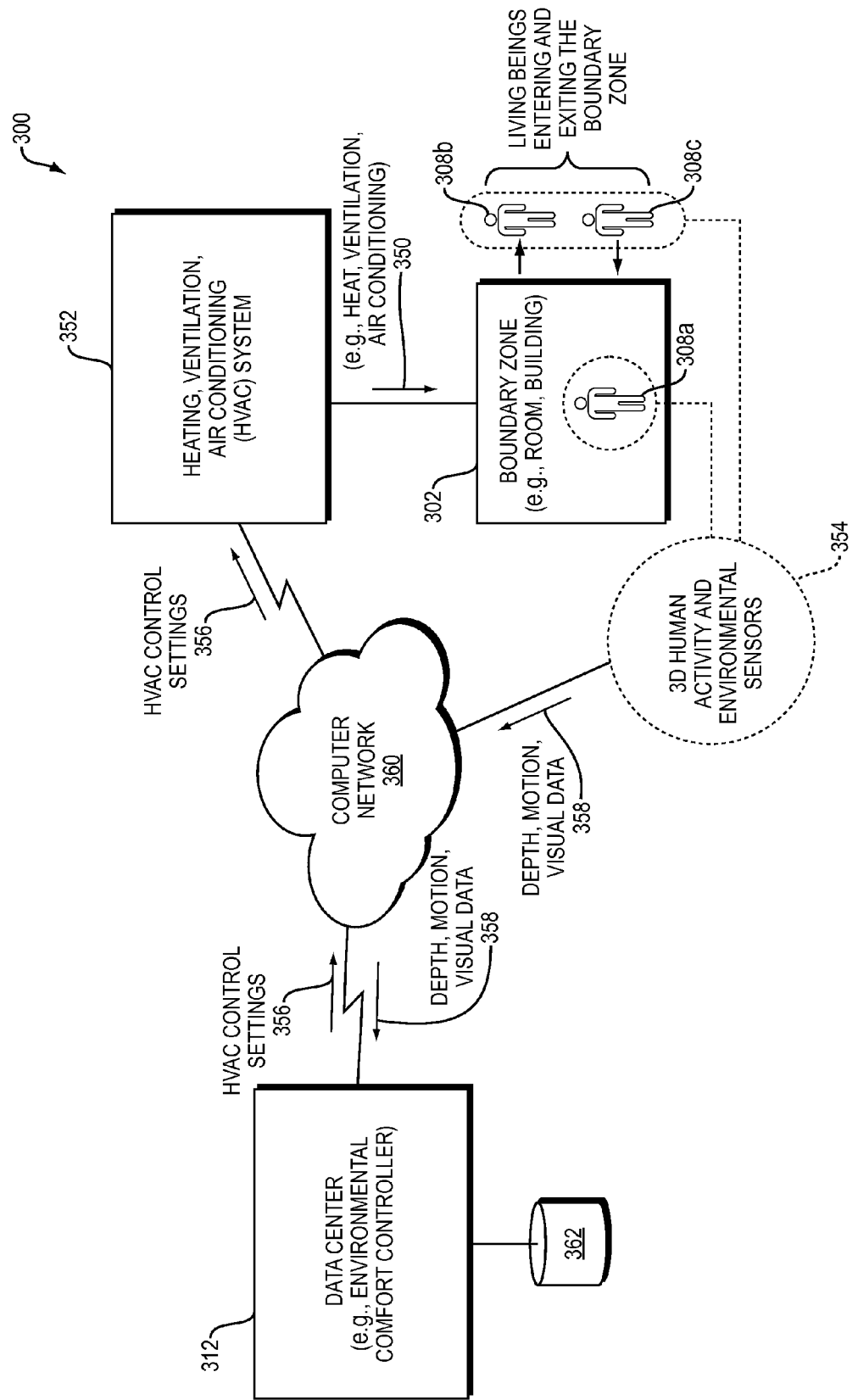
FIG. 3 is a block diagram of an embodiment of a control system for providing environmental comfort to living beings.

FIG. 3 is a block diagram of an embodiment of a control system 300 for providing environmental comfort (e.g., heat, ventilation, air conditioning) 350 to living beings 308a-c. The control system 300 may include an HVAC system 352 that provides environmental comfort 350, such as heat, ventilation, and air conditioning, to a boundary zone 302. The boundary zone 302 may be any suitable indoor space, such as a room, building or any other suitable space, that living beings may enter and exit. The control system 300 may include 3D human activity and environmental sensors 354. The 3D human activity and environment sensors 354 may include one or more depth sensors (not shown) and one or more motion/visual sensors (not shown).

According to embodiments disclosed herein, a depth sensor (not shown) may be mounted above the entrance of a boundary zone 302, such as a room, to monitor and detect motion in order to count the number of people entering and leaving the room to determine room occupancy. An assistant video camera (not shown) may be mounted in the room to perform verification and error correction for the room occupancy determined. Based on the learned occupancy of the boundary zone 302 and parameters (e.g., dimensions) of the boundary zone 302, HVAC control settings 356 may be dynamically adjusted to control environmental comfort 350 of the boundary zone 302. Activities of the room occupants may also be learned and information regarding the activities learned may also be utilized for adjusting the HVAC control settings 356. The HVAC control settings 356 may be advantageously controlled based on the pattern of activities learned, such as a pattern for room occupancy, or a level of motion for the occupants. The HVAC control settings 356 may be dynamically adjusted by a data center 312, also referred to herein as an environmental controller, that receives depth, motion, and visual data 358 from the 3D human activity and environmental sensors 354.

The data center 312 may be a server, or other suitable computing device that is communicatively coupled to the HVAC system 352 and the 3D human activity and environment sensors 354 via a computer network 360. The computer network 360 may be a wide-area network (WAN), such as the Internet, a wireless network, a local-area network (LAN), a cellular network, or another suitable type of network or combination thereof. Alternatively, the data center 312 and the HVAC system 352 may be implemented as a single system (not shown) that is communicatively coupled with the 3D human activity and environment sensors 354 via the computer network 360 or via a direct connection.

The data center may combine the data from depth sensor and motion detection sensors 358 to determine if there are people in one or more boundary zones, such as boundary zone 302, and determine how many people are in the one or more boundary zones. Based on size of the one or more boundary zones, exhaust vent size for the boundary zone, and the number of people determined to be inside the room, a fan speed may be computed to control the temperature and air quality of the one or more boundary zones.

The data center 312 may be configured to learn patterns of activities of living beings 308a-c based on the depth, motion, and visual data 358 received via the computer network in order to set HVAC control setting 356 that provide environmental comfort 350 to a boundary zone 302. Environmental comfort 350 of the boundary zone 302 may be controlled before the boundary zone 302 is occupied. In this way, heating, air conditioning, and ventilation may be turned off when the boundary zone 302 is not in use and may be started to control the air and temperature to a comfortable level at an advantageous time before people use the boundary zone 302. Further, based on the degree of motion of the room occupants (e.g., sedentary versus aerobic), embodiments disclosed herein may set the HVAC control settings 356 advantageously based on the predicted number room occupants and the predicted level of motion of the room occupants on a given day, at a given time of day.

The depth, motion or visual data 358 may include metadata including counting information that may be sent to the data center 312 for further processing. Visual or motion sensors (not shown) mounted on the ceiling (not shown) inside the boundary zone 302 may be configured to provide extensive coverage of the boundary zone 302's interior space so as to detect motion within the space. The visual/motion sensors (not shown) may be configured to send motion detection metadata included in the depth, motion or visual data 358 and may be optionally periodically sent to the data center 312.

Motion detection data included in the depth, motion or visual data 358 may be useful to identify where people appear in the scene. For example, a background model may be established to detect motion based on background subtraction methods, such as a Gaussian model, Gaussian mixture model, or even a non-parametric background model. Depth data included in the depth, motion or visual data 358 may be calibrated to measure an object's, such as a living being's, 3D information. According to embodiments disclosed herein, counting persons may be based on depth segmentation and head detection. Depth segmentation may be used to initially decide if there are people in the scene, such a boundary zone. If a foreground object size is classified as being larger than one person, a head detection method may be applied to measure and determine the number of heads in the scene. A "tripwire" (not shown), such as a virtual tripwire, may be setup in the boundary zone to detect when a person enters or exits via a doorway or other suitable type of entrance, exit, or combination thereof. Embodiments disclosed herein may track a detected head based on locations of the head detected in contiguous frames of data included in the depth, motion or visual data 358. As long as the head is detected as crossing the virtual tripwire, metadata indicating same may be included in the depth, motion or visual data 358 sent to the data center 312.

Figure 4:
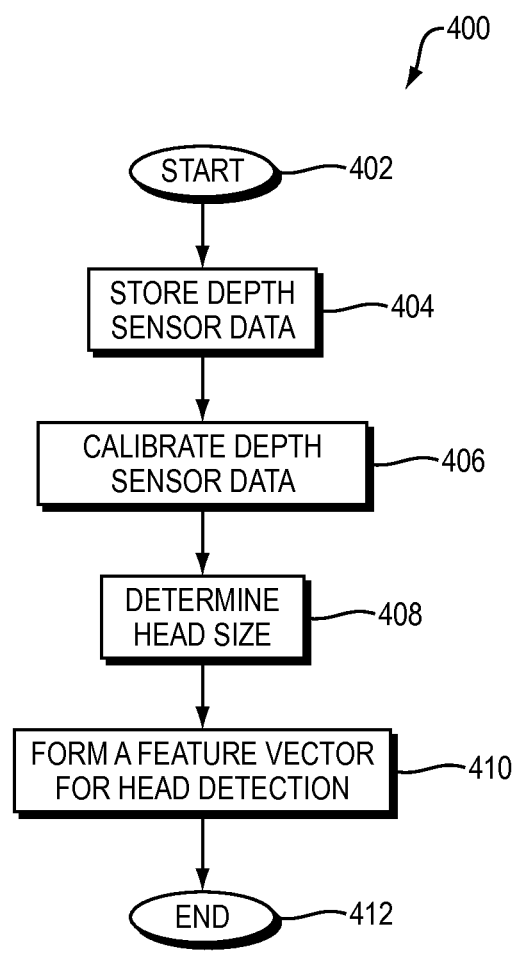
FIG. 4 is an example flow diagram of an embodiment of a method for head detection.

FIG. 4 is an example flow diagram of an embodiment of a method for head detection (400). The head detection method (400) may be based on the depth sensor data, such as depth sensor data 114 of FIG. 1 or depth sensor data included in the depth, motion or visual data 358 of FIG. 3. The method 400 may start (402) and store depth sensor data (404). According to one embodiment, the depth sensor data may be stored as a two dimensional array. The depth sensor data may be calibrated based on measurements for real-world objects (406). After calibration, the depth sensor data may provide a distance between the depth sensor and the real-world objects measured. Based on the calibrated data, dimensions for a head size may be determined in order to detect heads (408).

For example, according to one embodiment a distance from a camera to a head center may be X meters, and an image width may be M pixels. An angle that a depth sensor may cover may be α. Computation of a size of the head in pixels may be based on the distance. For example, the physical range that the depth sensor may cover at the distance of X meters may be computed as:

$$w = 2 * X \tan\left(\frac{\alpha}{2}\right)$$

Based on this physical range computed, head size in pixels may be derived. For example, an average head radius may be r meters, represented in pixels as:

$$R = \frac{rM}{2 * X \tan\left(\frac{\alpha}{2}\right)}$$

A sliding window of size R×R may be checked with a non-max suppression method for head detection. For example, the non-max suppression method may be applied to avoid multiple heads overlapping. According to embodiments disclosed herein, head detection may be based on a histogram of oriented depth gradient (HODG) that counts occurrences of gradient orientation in a selected window. The gradient provides a sign to indicate a real direction of the gradient instead of a magnitude of the gradient, enabling a determination of whether or not the gradient is up or down.

The sliding window may first be divided into P×Q cells at first, such as 3×3 or 4×4. The gradient orientations may be computed within the cells. A histogram of weighted gradient orientations may be used to represent the cell. A monolithic function of depth gradient may be applied as the weight. The histogram data of the weighted depth gradient orientations may be combined together to form a feature vector for head detection (410), and the method (412) thereafter ends in the example embodiment.

According to embodiments disclosed herein, head detection may combine calibrated head features, fast feature extraction, with an efficient classification method to achieve real-time head detection. The advantage of calibration of a feature is that a head size may be utilized; thus, it is not necessary to detect in multi-scale as other methods, such as is necessary in histogram of orient gradients (HOG) object detection. According to embodiments disclosed herein, head detection may be more efficient by enabling a single scale to be used for head detection, as opposed to other more computationally intensive methods that may estimate a scale for an image and downsize the scale until alignment with a template is achieved. The detected heads may be used to assist head tracking if more than one person is entering a detection zone of a boundary zone. A learning method for activity patterns of room occupancy may be based on head detection and may include a random forest, neural network, support vector machine, or other suitable learning methods. In order to accelerate feature computation, embodiments disclosed herein may utilize an integral image of quantized gradient orientations to enable the acceleration.

Figure 5:
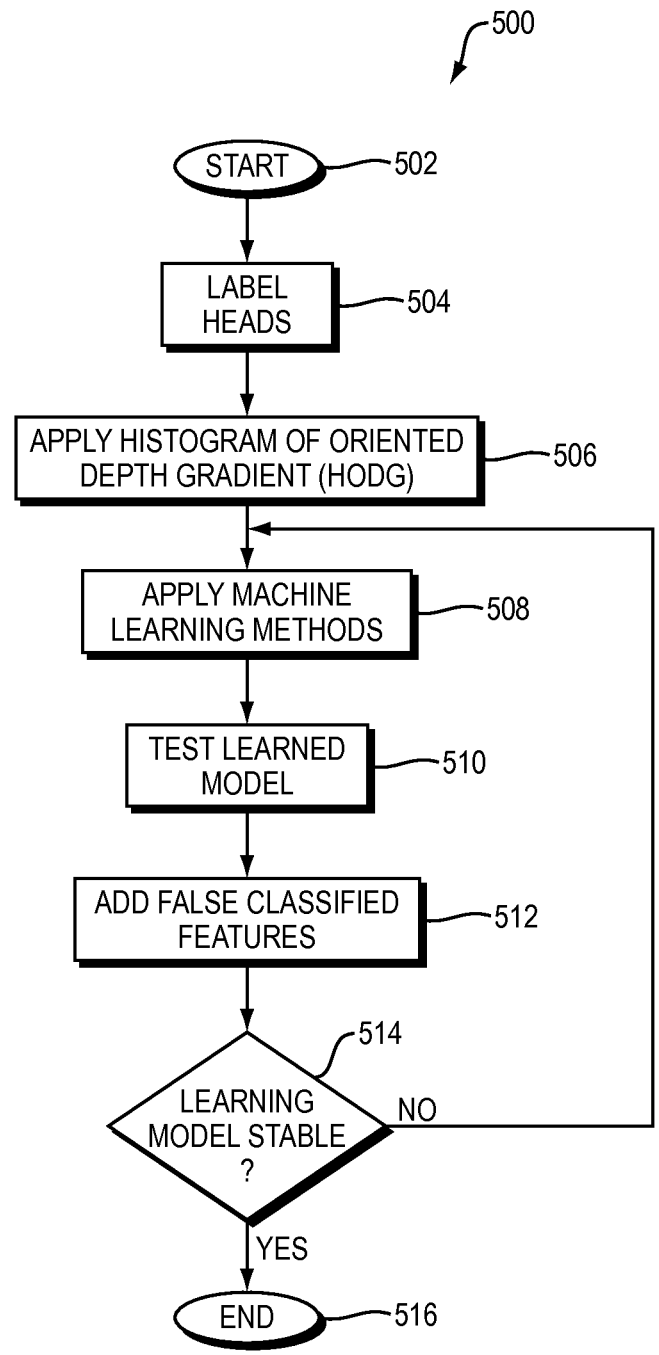
FIG. 5 is a flow diagram of an embodiment of a method for incremental learning.

FIG. 5 is a flow diagram of an embodiment of a method for incremental learning 500. The method may start (502) and label heads based on training depth images to create a labeled test image set (504). The method may apply HODG to extract head features as positive features and extract features of other locations as negative features. The method may apply machine learning methods (e.g., back propagation neural network) to learn a classifier for a given training data (508). The method may test the model learned with the labeled test image set (510). The method may add false classified features into the training set to form a new dataset for continued learning (512). The method may check if the model learned is stable based on whether or not a classification error is lower than a given threshold (514). If not, the method may again apply machine learning methods (e.g. back propagation neural network) to learn a classifier for a given training data (508). If the model learned is stable, the method thereafter ends (516) in the example embodiment.

Figure 6A:
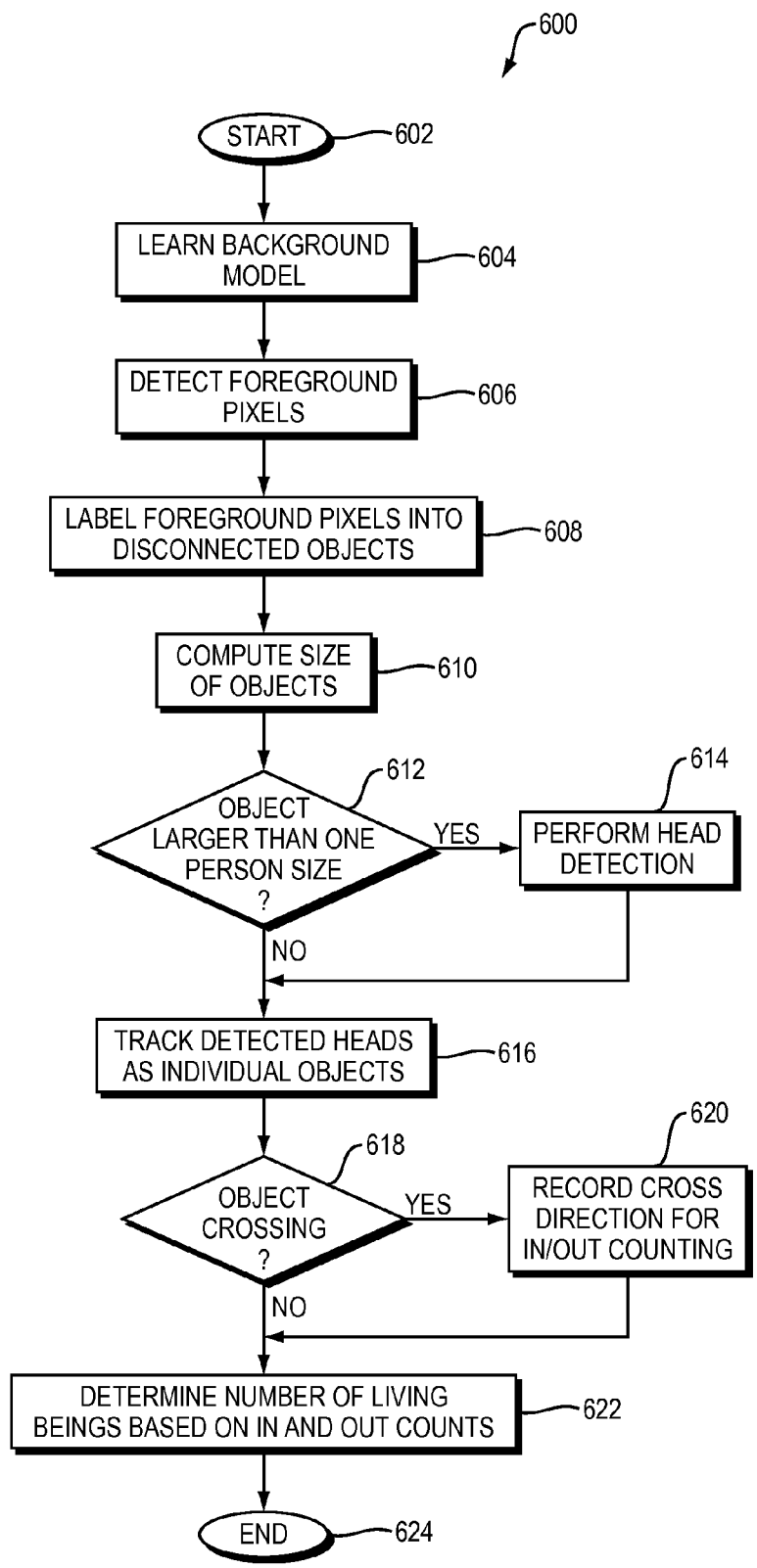
FIG. 6A is a flow diagram of an embodiment of a method for counting living beings.

FIG. 6A is a flow diagram of an embodiment of a method for counting living beings. The method may start (600) and learn a background model of a scene (604). The method may detect foreground pixels that are closer to the depth sensor with a given predefined threshold using background subtraction (606). The method may use to label the foreground pixels into disconnected objects using connected component analysis (608). The method may compute the size of the objects (610). A check may be made as to whether or not the size of the object is larger than a given size of a single person (612). If yes, the method may apply a head detection method to check if more than one head may be detected (614). Regardless of whether or not a single or multiple number of heads are detected, the method may track all the detected heads as individual objects (616). As described above, a virtual tripwire may be applied to detect if an object crosses over it, however, any suitable mechanism may be employed to determine if an object crosses a detection zone. A check may be made to determine if an object crossing is detected (618). If yes, a cross direction may be recorded for In/Out (e.g., enter and exit) counting (620). Regardless of whether or not an object crossing is detected, the method may compute a delta value between the summation of "In" counts and the summation of "Out" counts to determine the number of people within a boundary zone (622), and the method thereafter ends (624) in the example embodiment.

In order to prevent miscounting, embodiments disclosed herein may utilize additional motion/visual sensor data from one or more motion/visual sensors mounted within the boundary zone in order to detect further motion. If the one or more motion/visual sensors in the boundary zone do not detect motion within a given period of time, the current counting value for the boundary zone may be set to null. The output of depth sensors and motion/visual sensors may be sent to an environmental controller in any suitable form, such in the form of metadata, to enable room occupancy pattern analysis and HVAC control.

The environmental controller (otherwise referred to herein as a data center) 112 of FIG. 1 and the data center 312 of FIG. 3 may combine the data from depth sensors and motion detection sensors to determine if there are people in one or more boundary zones and to determine how many people occupy the one or more boundary zones. Based on parameters associated with the one or more boundary zones, such as parameters for the size of the one or more boundary zones, corresponding exhaust vent size, or other suitable parameters, and a number of people determined to be inside the one or more boundary zones, HVAC control settings, such as a fan speed for an exhaust vent, may be computed to control environmental comfort, such as the temperature and air quality of the one or more boundary zones.

As more and more data is collected, the counting information of the occupants may be used as statistics data to derive a pattern of boundary zone usage, such as a pattern of building usage, over time. Based on the information collected and derived, a statistical model may be setup as follows to enable prediction of the probability of room occupancy and to adjust one or more HVAC control settings dynamically for better temperature and ventilation control in order to provide environmental comfort and to provide energy savings. According to embodiments disclosed herein, depth sensors may be mounted for all the entrances and exits of a building and its rooms. Corridors, elevators, and stairs may also optionally be monitored.

FIG. 6B is a block diagram of an embodiment of a table for building occupancy (650). The table 650 may be stored in the database 362 and may be maintained by the data center 312 of FIG. 3. The table 650 may be based on a fine-granularity time slice that may be constructed for a building. The data collected may include the number of people 654, time of the sampling 652, location 656, and, optionally, an activity level of the room occupants 658 at the time of the sampling. The activity level may be specified in any suitable manner, for example, the activity level may be a number reflecting a degree of activity, such as low, medium, or high, or the activity level may reflect a type of activity, such as sedentary or aerobic.

Figure 6C:
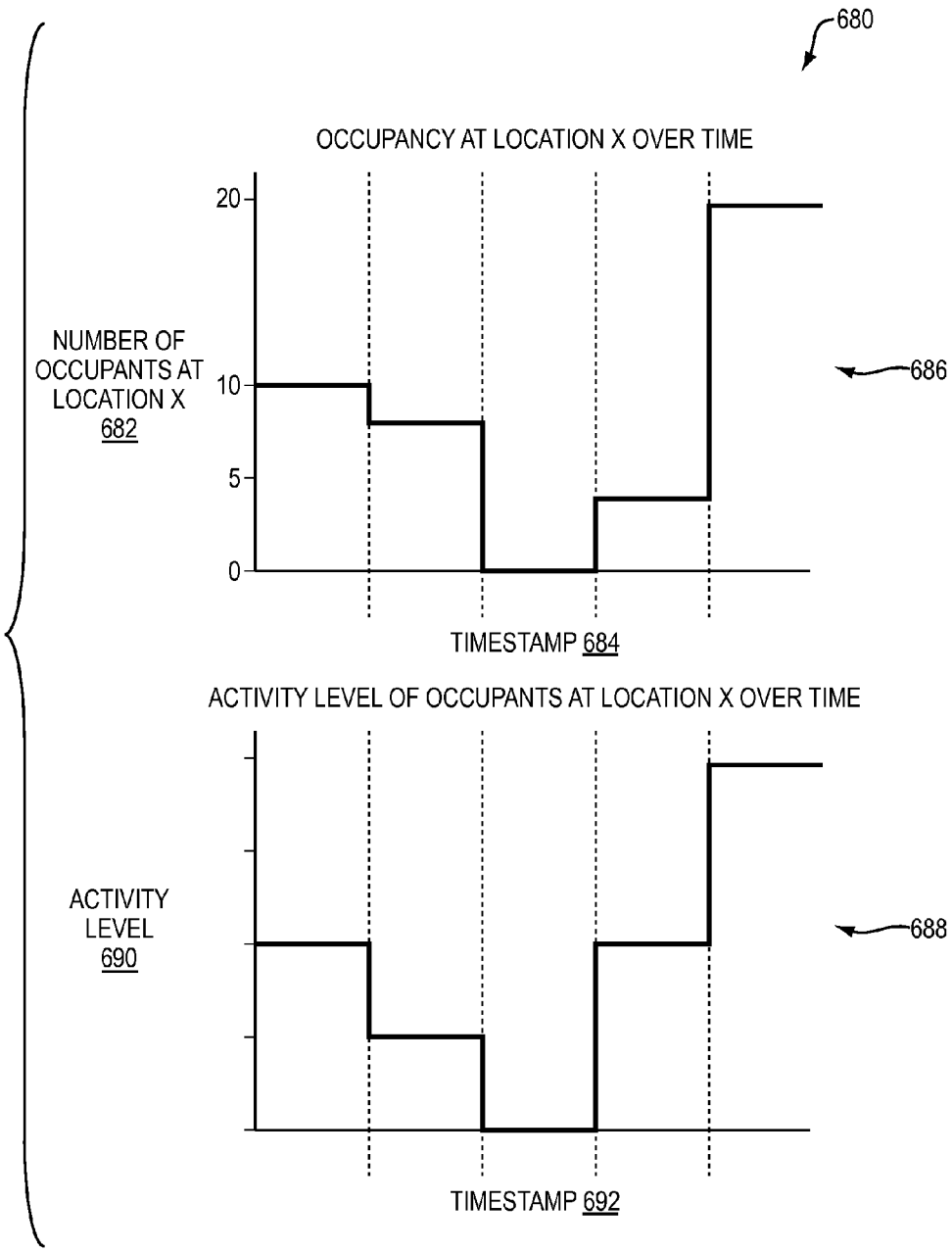
FIG. 6C are graphs of embodiments for learned activity patterns.

FIG. 6C are graphs of embodiments for learned activity patterns 680. The graphs 650 may include information that is based on the table for building occupancy. For example, a learned activity pattern 686 may be a pattern of a number of occupants at a given location (682) associated with a corresponding timestamp 684. The learned activity pattern may optionally also include a learned activity pattern 688 of an activity level 690 for the number of occupants at a given location (682) associated with a corresponding timestamp 692.

HVAC control may be hierarchical. For example, the building may have a general control as well as individual room/space controls. The general control may be enabled to turn on/off the HVAC control for the entire building. The general control may also be divided into different areas of the building, such as different levels or wings of the building, and each area may have its own general control. The total activity monitoring of the building may be achieved by combining all the activities of the rooms, corridors, elevators, and stairs. According to embodiments disclosed herein, HVAC control may have the following modes:

M1: Entire building energy saving mode: the HVAC runs in a conservative mode.

M2: Entire building energy saving mode with individual room control: the HVAC runs in a conservative mode with individual rooms having normal HVAC control.

M3: General active mode: the entire building is under normal HVAC control.

M4: General active mode with individual room control: the entire building, except some low activity rooms, are under normal HVAC control.

If the total activity is low, for example, on weekends or holidays, the entire building may be in the entire building energy saving mode (M1). The entire building may be set to cut-off HVAC control unless severe weather is present, such as too hot or too cold, based on the M1 mode. Cut-off HVAC control may set room temperatures higher than normal temperature in hot weather and lower than normal temperature in cold weather by several degrees.

If only a small portion of the building has activities, the entire building energy saving mode with individual room control may be applied (M2). In this mode, only the rooms with activities may be controlled normally, and other portions of the building may not be controlled in HVAC.

If the building is determined to be active in general, the general active mode (M3) may be applied. In this mode, even though rooms may not be frequently occupied, temperature and ventilation of the spaces may still be controlled.

If the building has limited occupancy, the general active mode with individual room control (M4) may be applied. In this mode, the open spaces and rooms with frequent activities may be under HVAC control normally while the open spaces and rooms without activities may have the HVAC control shut off.

In order to provide a comfortable HVAC environment, embodiments disclosed herein predict activities within one or more boundary zones, such as a building, based on the depth sensor and motion/visual data collected over the time.

For example, $N_i^T$ may be a count of people at a location, such as a boundary zone that may be an area i, at a time T. The area i may be a room, corridor, elevator, stairs or open spaces ($I \in [1,K]$) of a building. $S^T$ may be a total number of people in the building at time T, as shown below.

$$S^T = \sum_{i=1}^{K} N_i^T$$

Since the number of people may not available in a future time point, embodiments disclosed herein predict a number of people based on historical data collected and predict an HVAC control mode based on the number of people predicted.

A Kalman filter, such as a linear Kalman filter, may be used to predict $N_i^T$ based on the previous statistics $N_i^{T-t}$. Modeling may be based on a time period, such as a week, or any other suitable time period.

A state of the Kalman filter may be:

$$x_i^T = \{N_i^T, \Delta N_i^T\}$$

and $$x_i^{T+1} = A x_i^T + w_i^T,$$

where A may be referred to as a state transition matrix and $w_i^T$ may be a Gaussian noise random variable. $\Delta N_i^T$ may be a change of a number of people from time T−t to time T. A probability distribution may be:

$$P(w_i^T)=N(0,Q_i),$$

where $Q_i$ may be the process noise covariance matrix. A measurement $y_i^T = \{N_i^T\}$ may be expressed as:

$$y_i^T = Cx_i^T + v_i^T,$$

where C relates a state to a measurement and $v_i^T$ is the noise of the measurement that may be expressed as:

$$p(v_i^T)=N(0,R_i),$$

where $R_i$ is the measurement noise covariance matrix.

Initially $y_i^{T-t}$ may be observed, and a prediction for $y_i^T$ is determined. After the prediction is determined a measurement may be taken and $y_i^T$ may be observed, enabling predication and update of the predication for iterations based on the time period. As numbers of people in each area $\hat{N}_i^T$ are predicted, a predicted total number of people may be given as $$\hat{S}^T = \sum_{i=1}^{K} \hat{N}_i^T.$$

A model of HVAC may be determined as follows to predict the HVAC control mode. The HVAC control mode may be predicted based on the following:

$$M^T = \arg\max p(M = c)p(M^T \mid M^{T-t})\prod_{i=1}^{K} p(\hat{N}_i^T \mid \mu_{Ci}^T, \sigma_{Ci}^T)$$

$$= \arg\max p(M = c)p(M \mid M^{T-t})\prod_{i=1}^{K} \frac{e^{-\frac{(\hat{N}_i^T - \mu_{Ci}^T)^2}{2(\sigma_{Ci}^T)^2}}}{\sqrt{2\pi(\sigma_{Ci}^T)^2}}$$

where $M^T$ is the control mode at time T of a day. $M^{T-t}$ is the control mode at time T−t which can be a time of a last control mode, or the time of yesterday, the time of last week, or a combination of thereof. A week may be applied as the measurement period, though other lengths of time may alternatively be applied. $\hat{N}_i^T$ is the predicted number of people at time T for area i. $\mu_{Ci}^T$ is the average number of people in the area i at time T for control mode C. $\sigma_{Ci}^T$ is the standard deviation of the number of people in the area i at time T for an HVAC control mode C.

With a similar method, the mode selection for individual rooms can be given as $$R_i^T = \arg\max p(R = r \mid C)p(R^T \mid R^{T-t})p(\hat{N}_i^T \mid \mu_{Cir}^T, \sigma_{Cir}^T)$$

$$= \arg\max p(R = r \mid C)p(R \mid R^{T-t})\frac{e^{-\frac{(\hat{N}_i^T - \mu_{Cir}^T)^2}{2(\sigma_{Cir}^T)^2}}}{\sqrt{2\pi(\sigma_{Cir}^T)^2}},$$

where $R_i^T$ may be a status of HVAC control of room i at time T. The status may be any suitable status, such as ON or OFF. A number of people of the room i at the time T may be $N_i^T$, and $\mu_{Cir}^T$ and $\sigma_{Cir}^T$ are the mean and standard deviation of the number of people of room i at the time T under the HVAC mode C for different statuses.

Embodiments disclosed herein enable a model for determining when to turn on the HVAC for the individual rooms and the HVAC control settings, such as the different temperature and fan speed for individual preference. The HVAC model may be simplified with parameter t to indicate the time of a last control mode, or the time of yesterday, the time of last week, or a combination thereof. Transition probabilities p( ) may be obtained from the previously collected data and may be reinforced based on time as more and more data are collected.

With this statistical model, an HVAC control system may predict the activity level of a building and the rooms within it before the rooms become occupied or vacated. Based on the information collected and derived, the statistical model may enable prediction of the probability of room occupancy and enable dynamic adjustments of one or more HVAC control settings for better temperature and ventilation control in order to provide environmental comfort and to provide energy savings.

Figure 7:
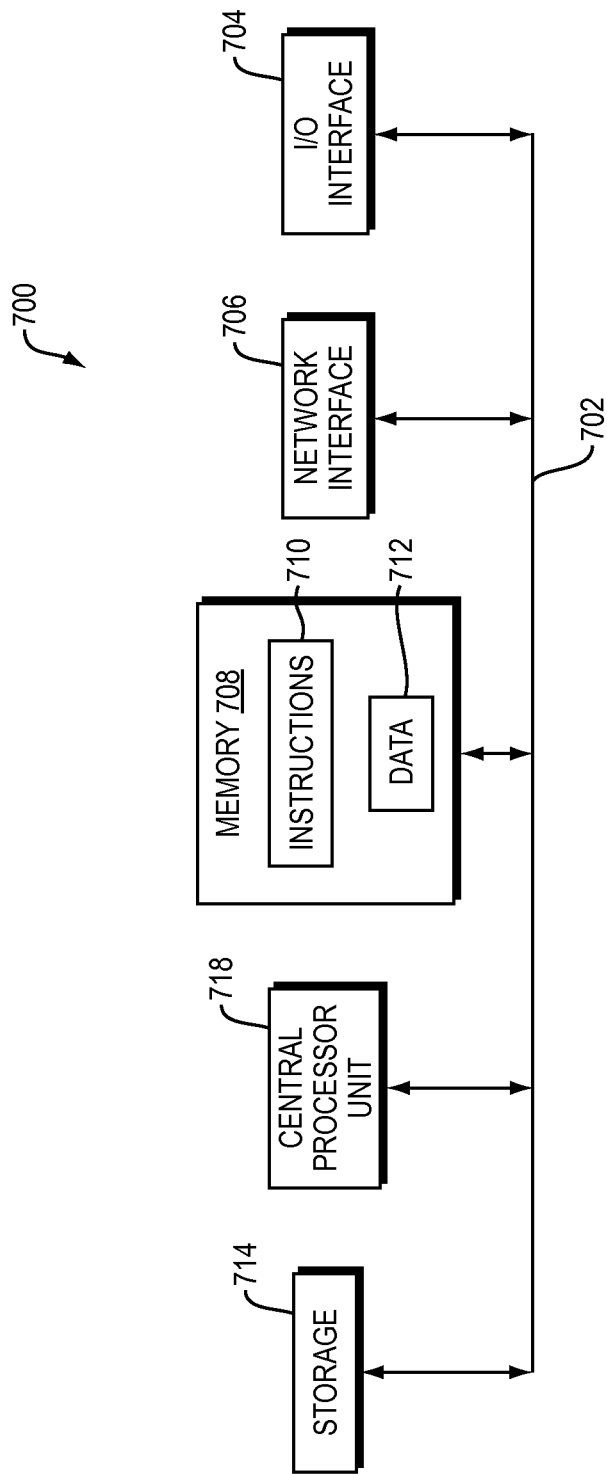
FIG. 7 is a block diagram of an example internal structure of a computer in which various embodiments of the present invention may be implemented.

FIG. 7 is a block diagram of an example of the internal structure of a computer 700 in which various embodiments of the present invention may be implemented. The computer 700 contains a system bus 702, where a bus is a set of hardware lines used for data transfer among the components of a computer or processing system. The system bus 702 is essentially a shared conduit that connects different elements of a computer system (e.g., processor, disk storage, memory, input/output ports, network ports, etc.) that enables the transfer of information between the elements. Coupled to the system bus 702 is an I/O device interface 704 for connecting various input and output devices (e.g., keyboard, mouse, displays, printers, speakers, etc.) to the computer 700. A network interface 706 allows the computer 700 to connect to various other devices attached to a network. Memory 708 provides volatile storage for computer software instructions 710 and data 712 that may be used to implement embodiments of the present invention. Disk storage 714 provides non-volatile storage for computer software instructions 710 and data 712 that may be used to implement embodiments of the present invention. A central processor unit 718 is also coupled to the system bus 702 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling environmental comfort of at least one boundary zone, the method comprising:
   monitoring a depth sensor mounted in proximity of an entrance, exit, or pathway of the at least one boundary zone to detect motion of living beings entering or leaving the at least one boundary zone through at least one detection zone, the at least one boundary zone having parameters associated therewith available to be used in adjusting an environmental control setting of the at least one boundary zone;
   determining a number of living beings present in the at least one boundary zone based on the motion detected through the at least one detection zone;
   monitoring at least one motion or visual sensor mounted within the at least one boundary zone for detecting motion of living beings within a respective interior space of the at least one boundary zone;
   collecting motion or visual data from the at least one motion or visual sensor mounted within the at least one boundary zone to verify and provide error correction for the number of living beings present in the at least one boundary zone determined based on the motion detected through the at least one detection zone; and
   determining at least one environmental control setting to enable control of environmental comfort of the at least one boundary zone based on the number of living beings determined, error correction associated therewith, and the parameters associated with the at least one boundary zone.

2. The method according to claim 1, wherein the parameters associated with the at least one boundary zone include dimensions for the at least one boundary zone, an exhaust fan size for a fan corresponding to the at least one boundary zone, or a combination thereof.

3. The method according to claim 1 further comprising:
   collecting depth data from the depth sensor monitored to enable statistical modeling used to predict a future number of living beings present in the boundary zone at a given future time.

4. The method according to claim 3, wherein the depth sensor includes an infrared laser projector coupled to a monochrome complementary metal-oxide-semiconductor (CMOS) sensor configured to capture three-dimensional video data under varying ambient light conditions.

5. The method according to claim 1, further comprising receiving depth data from a depth sensor, wherein determining the number of living beings present in the at least one boundary zone includes counting the living beings entering and exiting the at least one boundary zone based on the depth data received.

6. The method according to claim 5, further including utilizing depth segmentation and head detection methods on the depth data received to enable counting the living beings.

7. The method according to claim 1, further including:
   deriving a range for a head size of a measured living being at a given distance from a depth sensor based on measurements of the measured living being and depth data of the measured living being collected from the depth sensor; and
   receiving depth data from the depth sensor, wherein determining the number of living beings present in the at least one boundary zone includes counting the living beings entering and exiting the at least one boundary zone by detecting heads of the living beings based on the depth data received and the range for the head size derived.

8. The method according to claim 7 wherein the range for the head size includes a width and radius for the head size in pixels.

9. The method according to claim 1, wherein the at least one boundary zone is at least one of a room, building, or portion of building.

10. The method according to claim 1, further comprising controlling heating, ventilation, or air conditioning for the at least one boundary zone based on the at least one environmental control setting determined.

11. The method according to claim 1, further comprising:
    learning an activity pattern for occupancy of the at least one boundary zone by associating a timestamp with the number of living beings determined; and
    controlling heating, ventilation, or air conditioning for the at least one boundary zone based on the at least one environmental control setting determined and the activity pattern learned.

12. The method according to claim 11 wherein controlling heating, ventilation, or air conditioning for the at least one boundary zone includes adjusting the heating, ventilation, or air conditioning levels before or after the at least one boundary zone is occupied based on the activity pattern learned.

13. An apparatus for controlling environmental comfort of at least one boundary zone, the apparatus comprising:
    a sensing module configured to monitor a depth sensor mounted in proximity of an entrance, exit, or pathway of the at least one boundary zone to detect motion of living beings entering or leaving at least one boundary zone through at least one detection zone, the at least one boundary zone having parameters associated therewith available to be used in adjusting an environmental control setting of the at least one boundary zone;
    a data center module configured to determine a number of living beings present in the at least one boundary zone based on the motion detected though the at least one detection zone, wherein the data center module is further configured to monitor an output of at least one motion or visual sensor mounted within the at least one boundary zone to detect motion of living beings within a respective interior space of the at least one boundary zone and to collect motion or visual data from the output monitored to provide error correction for the number of living beings present in the at least one boundary zone determined based on the motion detected though the at least one detection zone; and
    a heating, ventilation, and air conditioning (HVAC) control module configured to determine at least one environmental control setting used to control environmental comfort of the at least one boundary zone based on the number of living beings determined, error correction associated therewith, and the parameters associated with the at least one boundary zone.

14. The apparatus according to claim 13, wherein the parameters associated with the at least one boundary zone include at least one of dimensions for the at least one boundary zone or an exhaust fan size for a fan corresponding to the at least one boundary zone.

15. The apparatus according to claim 13, wherein the sensing module further includes a motion detection module configured to detect motion by monitoring an output of the depth sensor and to collect depth data from the output monitored to enable statistical modeling used to predict a future number of living beings present in the boundary zone at a given future time.

16. The apparatus according to claim 15, wherein the depth sensor includes an infrared laser projector coupled to a monochrome complementary metal-oxide-semiconductor (CMOS) sensor configured to capture three-dimensional video data under varying ambient light conditions.

17. The apparatus according to claim 13, wherein the HVAC control module is further configured to control heating, ventilation, or air conditioning for the at least one boundary zone based on the at least one environmental control setting determined.

18. The apparatus according to claim 13, wherein the data center module is further configured to receive depth data from a depth sensor and motion data from a motion or visual sensor and further configured to determine the number of living beings present in the at least one boundary zone based on the depth data and the motion data received, and still further wherein optionally the motion data includes visual data of the at least one boundary zone.

19. The apparatus according to claim 18, wherein the data center module is further configured to analyze the depth data received and perform depth segmentation and head detection methods on the depth data received to enable counting the living beings.

20. The apparatus according to claim 13, wherein the data center module is further configured to learn an activity pattern for occupancy of the at least one boundary zone by associating a timestamp with the number of living beings determined and wherein the HVAC control module is further configured to control heating, ventilation, or air conditioning for the at least one boundary zone based on the at least one environmental control setting determined and the activity pattern learned.

21. The apparatus according to claim 20 wherein the HVAC control module includes an adjustment module to adjust heating, ventilation, or air conditioning levels before or after the at least one boundary zone is occupied based on the activity pattern learned.

22. The apparatus according to claim 13, wherein the parameters associated with the at least one boundary zone include at least one: of dimensions for the at least one boundary zone or an exhaust fan size for a fan corresponding to the at least one boundary zone.

23. A non-transitory computer-readable medium having encoded thereon a sequence of instructions which, when loaded and executed by a processor, causes the processor to:
  monitor a depth sensor mounted in proximity of an entrance, exit or pathway of the at least one boundary zone to detect motion of living beings entering or leaving at least one boundary zone through at least one detection zone, the at least one boundary zone having parameters associated therewith available to be used in adjusting an environmental control setting of the at least one boundary zone;
  determine a number of living beings present in the at least one boundary zone based on the motion detected through the at least one detection zone;
  monitor at least one motion or visual sensor mounted within the at least one boundary zone to detect motion of living beings within a respective interior space of the at least one boundary zone; and
  collect motion or visual data from the at least one motion or visual sensor mounted within the at least one boundary zone to verify and provide error correction for the number of living beings present in the at least one boundary zone determined based on the motion detected through the at least one detection zone; and
  determine at least one environmental control setting to enable control of environmental comfort of the at least one boundary zone based on the number of living beings determined, error correction associated therewith, and the parameters associated with the at least one boundary zone.

24. A method for controlling heating, ventilation, or air conditioning (HVAC), the method comprising:
  building a probability distribution of the number of counts of living beings for at least one boundary zone during at least one time period to determine at least one HVAC control mode, the at least one HVAC control mode providing environmental comfort to the at least one boundary zone based on counts of living beings occupying the at least one boundary zone;
  building a statistical model including the probability distribution, the statistical model being configured to predict at least one HVAC control mode to use for a given time period based on a previous HVAC control mode of the at least one HVAC control mode having been used for a previous time period corresponding to the given time period;
  updating the probability distribution based on counting the number of living beings in the at least one boundary zone for the given time period to adjust a predication of a future HVAC control mode of the at least one HVAC control mode; and
  controlling HVAC for the at least one boundary zone for the given time period using HVAC control mode predictions from the statistical model.

25. The method of claim 24 further comprising:
  collecting historical data including count information of living beings in the at least one boundary zone for at least one previous time period;
  including a Kalman filter in the statistical model; and
  configuring the Kalman filter included to predict counts of living beings in the at least one boundary zone based on the historical data collected.

26. The method of claim 25 wherein the Kalman filter is a linear Kalman filter.

27. The method of claim 24 wherein the given time period is a time of day, day, week, month, year, or weekend.

28. The method of claim 24 wherein the at least one boundary zone is a room, corridor, elevator, stairway, building, open space of the building, or a combination thereof.

* * * * *